US010178538B1

(12) United States Patent
Panigrahi et al.

(10) Patent No.: US 10,178,538 B1
(45) Date of Patent: Jan. 8, 2019

(54) AERIAL COMMUNICATION FRAMEWORK FOR PROVIDING COMMUNICATION SERVICES TO USERS TRAPPED IN EMERGENCY

(71) Applicant: Tata Consultancy Services Limited, Mumbai (IN)

(72) Inventors: Bighnaraj Panigrahi, Bangalore (IN); Hemant Kumar Rath, Bhubaneswar (IN); Prasant Kumar Misra, Bangalore (IN); Anantha Simha, Bangalore (IN); Alok Ranjan, Rourkela (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 15/920,722

(22) Filed: Mar. 14, 2018

(30) Foreign Application Priority Data

Dec. 28, 2017 (IN) .............................. 201721047095

(51) Int. Cl.
*H04M 11/04* (2006.01)
*H04W 4/90* (2018.01)
*H04W 72/12* (2009.01)
*H04W 72/04* (2009.01)
*H04W 4/029* (2018.01)
*H04W 88/08* (2009.01)

(52) U.S. Cl.
CPC ............. *H04W 4/90* (2018.02); *H04W 4/029* (2018.02); *H04W 72/044* (2013.01); *H04W 72/1231* (2013.01); *H04W 72/1247* (2013.01); *H04W 88/08* (2013.01)

(58) Field of Classification Search
CPC ... H04W 4/90; H04W 72/1231; H04W 4/029; H04W 72/1247; H04W 72/044; H04W 88/08
USPC ...................................................... 455/404.2
See application file for complete search history.

(56) References Cited

U.S. PATENT DOCUMENTS

| 9,594,372 B1 | 3/2017 | Sills et al. | |
|---|---|---|---|
| 2011/0130636 A1* | 6/2011 | Daniel ................. | G08B 25/016 600/301 |

(Continued)

FOREIGN PATENT DOCUMENTS

CN 105068486 11/2015

*Primary Examiner* — Amancio Gonzalez
(74) *Attorney, Agent, or Firm* — Finnegan, Henderson, Farabow, Garrett & Dunner LLP

(57) ABSTRACT

The present disclosure is related to a system and method for providing aerial communication services to users trapped in disaster conditions and need immediate attention. It includes an UAV mounted with a central base station to establish communication services with each communication equipment by modeling of an emergency communication network. It analyzes utility function of criticalities to assure an efficient resource allocation mechanism where critical users get preference over non-critical users. The users can be in a critical state either due to low remaining energy of at least one communication equipment of the one or more users or because of the criticality due to their physical surroundings and data rate component to ensure throughput for the communication services. An assisted global positioning system (A-GPS) is being used for obtaining information of physical criticality of the users distributed over a geographical area.

13 Claims, 3 Drawing Sheets

(56) References Cited

U.S. PATENT DOCUMENTS

| | | | |
|---|---|---|---|
| 2013/0263527 A1* | 10/2013 | Barrett | E04B 1/343 |
| | | | 52/79.1 |
| 2013/0336176 A1 | 12/2013 | Rubin et al. | |
| 2014/0278801 A1* | 9/2014 | Barrett | G06Q 30/0205 |
| | | | 705/7.34 |
| 2014/0373124 A1 | 12/2014 | Rubin et al. | |
| 2016/0214717 A1* | 7/2016 | De Silva | B64D 5/00 |
| 2017/0069214 A1* | 3/2017 | Dupray | G08G 5/0021 |

* cited by examiner

AERIAL COMMUNICATION FRAMEWORK FOR PROVIDING COMMUNICATION SERVICES TO USERS TRAPPED IN EMERGENCY

PRIORITY CLAIM

This U.S. patent application claims priority under 35 U.S.C. § 119 to India Application No. 201721047095, filed on Dec. 28, 2017. The entire contents of the abovementioned application are incorporated herein by reference.

TECHNICAL FIELD

The embodiments herein generally relates to the field of communication infrastructure and, more particularly, to a method and system for providing aerial communication services to users trapped in disaster scenarios.

BACKGROUND

Natural disaster always pose open challenges in both developed and developing nations. Research efforts are being attempted to predict such events and to tackle such situations in an efficient and time bound manner. Accessing the damage and conducting rescue operations are crucial steps in a post disaster operation. Further, emergency response to the affected users, restoration of damaged infrastructure, sanitization of the area and providing a faster communication framework become essential. In these situations where the communication infrastructure itself becomes dysfunctional, airborne, communication platforms would provide a feasible communication solution.

Unmanned Aerial vehicle (UAV) based systems are promising alternates to provide temporary wireless communication infrastructure, Compared to terrestrial networks, UAV aided wireless platform offers faster deploy time, mobility support higher flexibility and lower cost. Although, there have been increased research interests in exploiting the UAV based services, research efforts are still needed to address the challenges such as optimal aerial placement of low altitude platforms, reliable and accurate channel modeling, mobility modeling, efficient uplink and down-link scheduling etc. Research efforts are necessary to design a UAV based communication framework which can be used to serve the users who trapped in critical conditions and need immediate attention to send their messages.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, an embodiment herein provides an aerial communication system and method to provide communication services to one or more users distributed over a geographical area. The aerial communication system comprising a memory with a set of instructions, a processor and a utility analysis module configured to analyze a utility function of each user to score critical state of the user. The utility function of each user comprising at least one criticality of one or more criticalities of each user. Further the aerial communication system comprises a priority decision module which is configured to prioritize one or more users based on the score of utility function of each user and a criticality aware selection and scheduling module configured for optimizing a network performance and to allocate network resource blocks, consisting of plurality of spectrum chunks, to the one or more users based on output of the priority decision module. Further, the aerial communication system comprises a quality collection module within an unmanned aerial vehicle (UAV) mounted with a central base station which is configured to collect a channel quality indicator information and battery depletion level information from at least one communication equipment of each user. The central base station is configured for uplink scheduling to communicate with at least one communication equipment of the one or more users based on the collected a channel quality indicator information and output of the priority decision module. In addition to, the aerial communication system comprises an assisted global positioning system (A-GPS) to obtain information of physical criticality of the one or more users distributed over a geographical area. The one or more criticalities of the user includes a low remaining energy of the at least one communication equipment of the one or more users, a physical surroundings of the one or more users and a data rate component to ensure throughput for the communication services to at least one communication equipment. The one or more users are in semi-static without much movements in a short frame of time. Moreover, it is to be appreciated that this framework is to be used to prioritize users whose device battery power is low and hence their messages should be conveyed as quickly as possible before the battery power depletes completely.

In another aspect the embodiment here provides a method for providing aerial communication services to one or more users distributed over a geographical area, the method comprising analyzing a utility function of each user to score critical state of the user using an utility analysis module, wherein the utility function of each user comprising at least one criticality of one or more criticalities of each user, prioritizing one or more users based on the score of utility function of each user using a priority decision module, optimizing a network performance for allocating resource blocks to the one or more users based on priority using a critical aware scheduling module, collecting a channel quality indicator information of each communication equipment of the one or more users using a quality collection module and finally providing an unmanned aerial vehicle (UAV) mounted with a central base station, wherein the central base station is configured for uplink scheduling to communicate with at least one communication equipment of the one or more users based on the collected channel quality indicator information and output of the priority decision module. In addition to this, an assisted global positioning system to be used (A-GPS) to obtain information of physical criticality of the one or more users distributed over a geographical area. The one or more criticalities of each user includes a low remaining energy of each at least one communication equipment, a physical surroundings of the user and a data rate component to ensure throughput for the communication services with at least one communication equipment. The one or more users are in semi-static without much movements in a short frame of time. Moreover, it would be appreciated that this framework to be used to prioritize one or more users whose device battery power is low and hence their messages should be conveyed as quickly as possible before the battery power depletes completely.

In another aspect the embodiment here provides a non-transitory computer readable medium storing one or more instructions for providing aerial communication services to one or more users distributed over a geographical area. The one or more instructions comprising analyzing a utility function of each user to score critical state of the user using an utility analysis module, wherein the utility function of each user comprising at least one criticality of one or more criticalities of each user, prioritizing one or more users based on the score of utility function of each user using a priority decision module, optimizing a network performance for allocating resource blocks to the one or more users based on priority using a critical aware scheduling module, collecting a channel quality indicator information of each communication equipment of the one or more users using a quality collection module and finally providing an unmanned aerial vehicle (UAV) mounted with a central base station, wherein the central base station is configured for uplink scheduling to communicate with at least one communication equipment of the one or more users based on the collected channel quality indicator information and output of the priority decision module. In addition to this, an assisted global positioning system to be used (A-GPS) to obtain information of physical criticality of the one or more users distributed over a geographical area. The one or more criticalities of each user includes a low remaining energy of each at least one communication equipment, a physical surroundings of the user and a data rate component to ensure throughput for the communication services with at least one communication equipment. The one or more users are in semi-static without much movements in a short frame of time. Moreover, it would be appreciated that this framework to be used to prioritize one or more users whose device battery power is low and hence their messages should be conveyed as quickly as possible before the battery power depletes completely.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

BRIEF DESCRIPTION OF THE DRAWINGS

The embodiments herein will be better understood from the following detailed description with reference to the drawings, in which.

DETAILED DESCRIPTION OF EMBODIMENTS

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
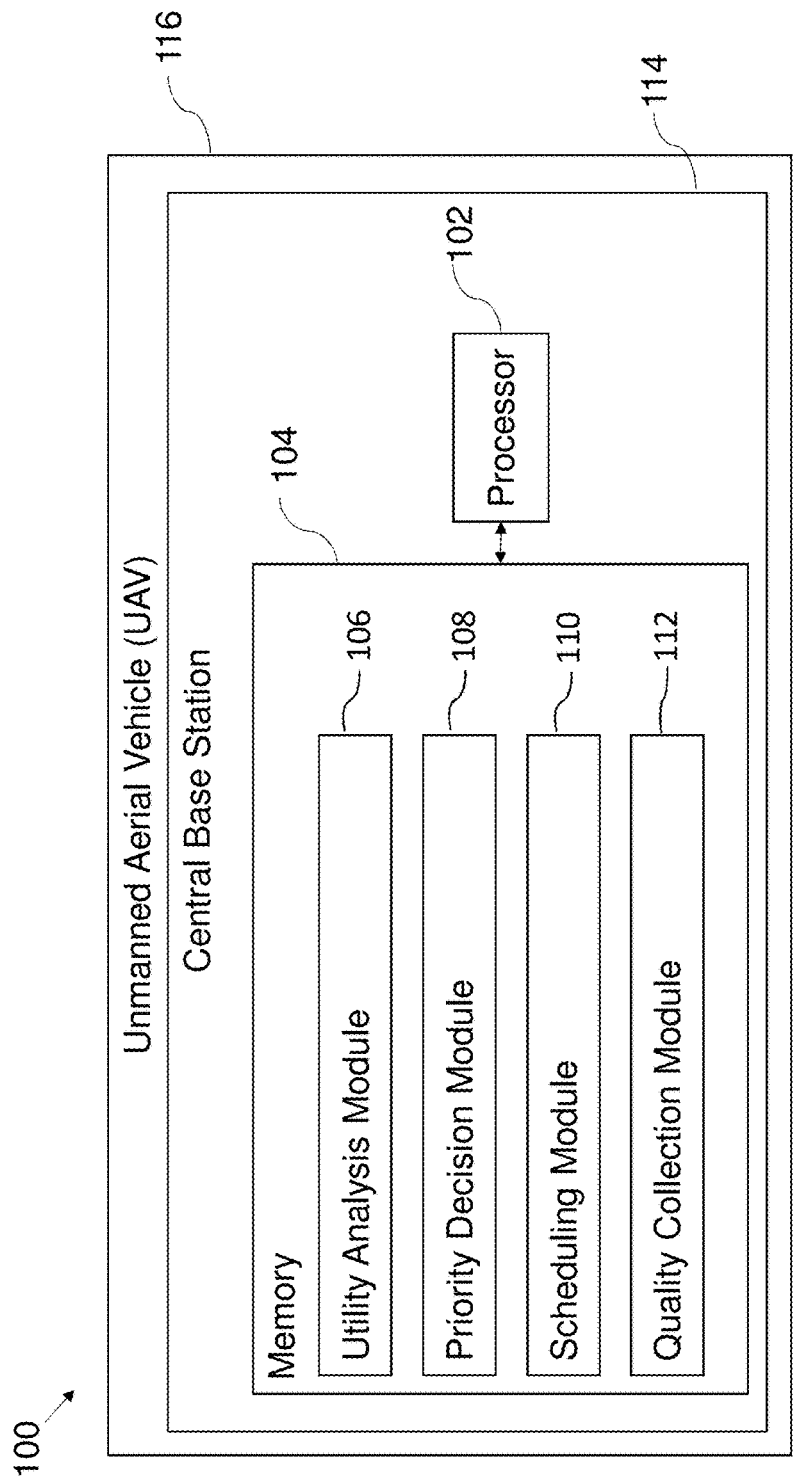
FIG. 1 illustrates a block diagram for providing communication services to one or more users distributed over a geographical area according to an embodiment of the present disclosure.
Figure 2:
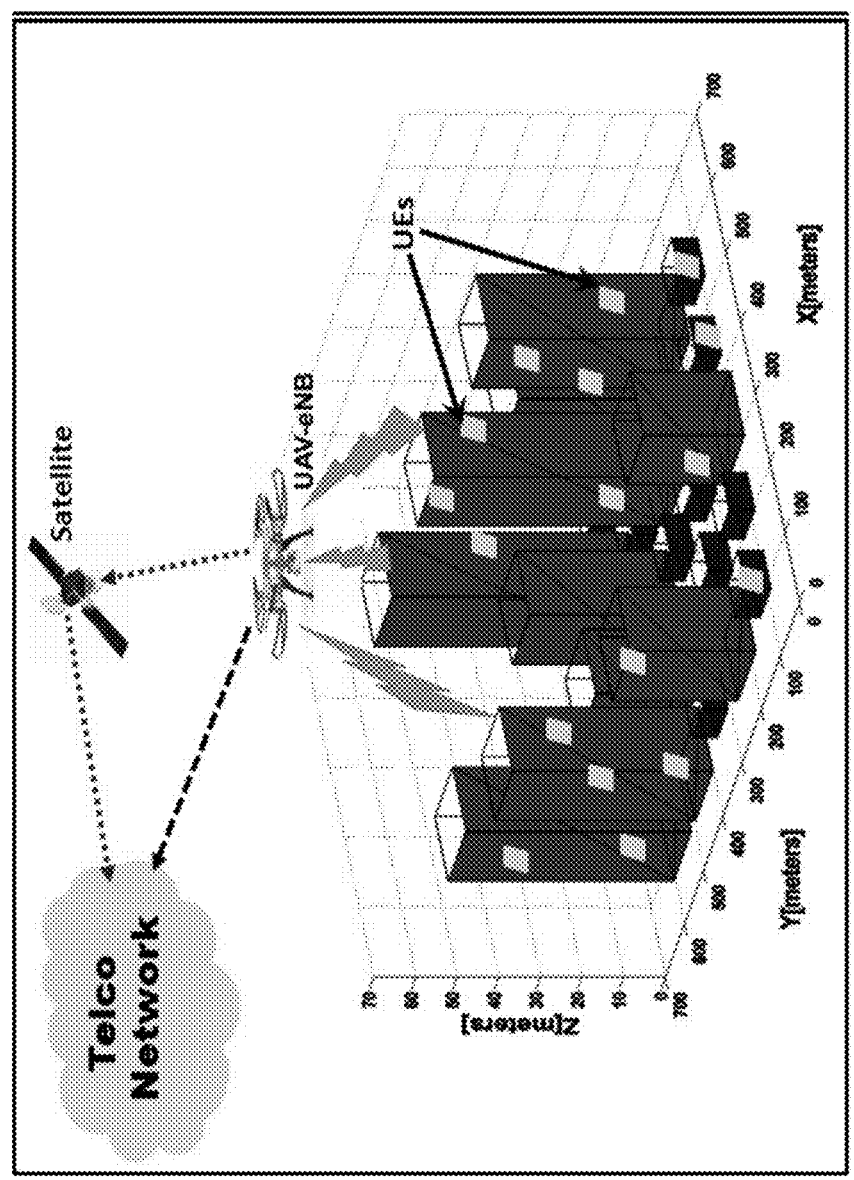
FIG. 2 shows a schematic architectural view of the aerial communication system according to an embodiment of the disclosure.
Figure 3:
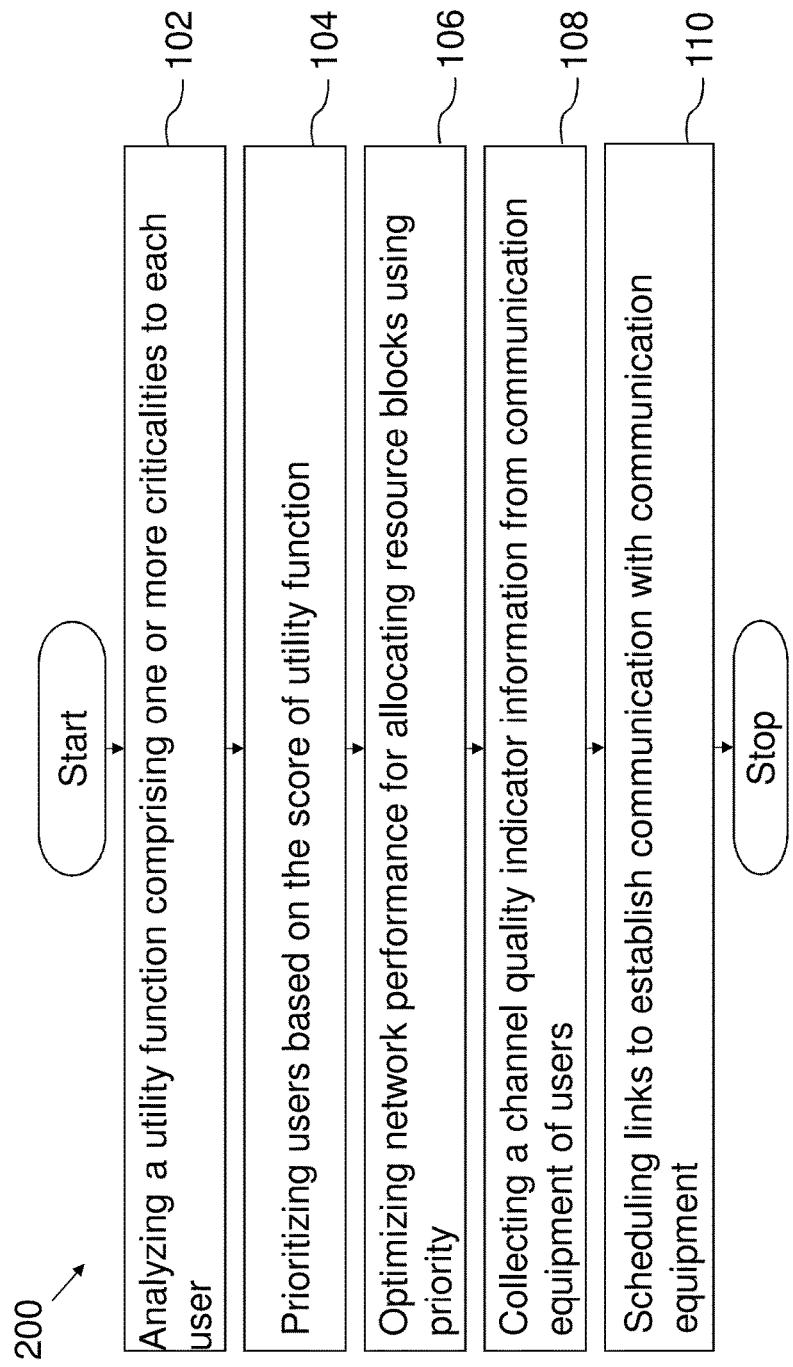
FIG. 3 is a flowchart illustrating the steps involved in providing communication services to one or more users distributed over a geographical area according to an embodiment of the present disclosure.

Referring now to the drawings, and more particularly to FIG. 1 through FIG. 3, where similar reference characters denote corresponding features consistently throughout the figures, there are shown preferred embodiments and these embodiments are described in the context of the following exemplary system and/or method.

According to an embodiment of the disclosure, an aerial communication system (100) for providing communication services to one or more users distributed over a geographical area is shown in FIG. 1. The system (100) comprising a memory (102) with a set of instructions, a processor (104), an utility analysis module (106), a priority decision module (108), a scheduling module (110), a quality collection module (112) and a central base station (114) mounted on an unmanned aerial vehicle (UAV) (116) as shown in the block diagram of FIG. 1. The aerial communication system (100) is enabled to set up a communication infrastructure which can be used to provide communication services to the users trapped in disaster scenarios and to send/receive messages, videos and images to/from the distressed users. It would be appreciated that the communication infrastructure such as a long term evolution (LTE) based Evolved Node B (eNB) is being used for the purpose of description of this disclosure but it should not be construed as limiting the scope of the disclosure herein.

According to an embodiment of the disclosure, the utility analysis module (106) of the aerial communication system (100) is configured to analyze a utility function of each user to score critical state of the user. The utility function of each user comprising at least one criticality of one or more criticalities to each user. The one or more criticalities include a low remaining energy of each at least one communication equipment of the one or more users, a physical surroundings of each user and a data rate component to ensure throughput for the communication services with at least one communication equipment of one or more users. An assisted global positioning system (A-GPS) to obtain information of physical criticality of the one or more users distributed over a geographical area.

In one example such as, in a disaster scenario such as flood in an urban environment, many users get trapped in their homes, offices, etc., and may not be able to communicate their messages. Due to devastated infrastructure, users may not get enough options to recharge their communication equipment. The users are distributed in different houses and buildings over a geographical area. In addition to, it is assumed that the users are semi-static without much movements in a short frame of time.

In the preferred embodiment, the utility function of each user represents low remaining energy of the at least one communication equipment of the one or more users, physical surroundings of the one or more users and data rate component to ensure throughput for the communication services with the at least one communication equipment of the one or more users.

In one embodiment, if the total utility function for user i as:

$$U_i = (\alpha C(c_i) + \beta E(\epsilon_i)) * R(r_i), \quad (1)$$

Where $C(c_i)$, $E(\epsilon_i)$, and $R(r_i)$ are the instantaneous functional values of physical criticality, remaining energy and data rates respectively of user i.

In the above mentioned equation, the utility function has two components such as a criticality component which depends on either physical criticality or energy criticality or both and a data rate component to ensure better throughput for the aerial communication system (100). These functional values are time dependent instantaneous values and decide the individual contribution of each utility components on the overall utility for a specific user. Further herein, $\alpha$, $\beta \in (0, 1)$ are the tuning parameters and are used to regulate the effect of physical and energy utility parameters.

Referring FIG. 2, consider a flood scenario, where the physical utility of a particular user can be defined in terms of its altitude of position. Three safety classes can be defined in terms of altitude of user i as:

$$\text{Safety class of } i = \begin{cases} \text{Danger,} & \text{if } Z_i \leq Z_{min} \text{ meters,} \\ \text{Moderate,} & \text{if } Z_{min} < Z_i \leq Z_{mid} \text{ meters} \\ \text{Safe,} & \text{if } Z_{mid} < Z_i \leq Z_{max} \text{ meters} \end{cases}$$

where, $Z_i$ is the altitude of user i, $Z_{min}$, $Z_{mid}$, and $Z_{max}$ are the threshold altitudes of the users that determines their safety class. It is to be noted that the moderate class users are in moderately unsafe locations and may lead into danger class in future. Hence, both the danger and moderate class are termed as physical criticalities class. Although altitudes of users are taken as a measure to define the criticality of a user, critical users may present at any of the building floors. Users in critical class have to be of higher priority and hence should get higher network utility while scheduling. Therefore, depending on the safety class of user i, the physical utility has different values such as:

$$C(c_i) = \begin{cases} c_1, & \text{if user } i \text{ is in Danger class} \\ c_2, & \text{if user } i \text{ is in Moderate class} \\ c_3, & \text{if user } i \text{ is in Safe class} \end{cases}$$

Where $c_1 > c_2 > c_3$

Further, in this example, the energy utility is a function of the battery energy of at least one communication equipment of the one or more users left for a user and should be higher for a user with low remaining energy and vice-versa.

$$E(\varepsilon) = \frac{1}{1 + e^{-a_1(\epsilon - \epsilon_{th1})}} \times \frac{1}{1 + e^{-a_2(\epsilon - \epsilon_{th2})}} \quad (2)$$

Where, $\epsilon_{th\ 1}$ = average remaining energy for end critical threshold;
$\epsilon_{th\ 2}$ = average remaining energy for start critical threshold;
$a_1$ = rate of decrement after critical energy threshold of $\epsilon_{th\ 1}$; and
$a_2$ = rate of increment after critical energy threshold of $\epsilon_{th\ 2}$.

To maximize the total network utility, so that it can improve the aerial communication system (100) throughput, the radio resources are scheduled based on channel quality between the eNB and the at least one communication equipment of the one or more users. In order to define utility based on the data rate of the user i the sigmoid function is:

$$R(r_i) = A \left\{ \frac{1}{1 + e^{-P^i(r_i - r^i)}} - D \right\} \quad (3)$$

where A, and D are the normalizing constants.

$$A = \frac{1 + e^{P^i r^i}}{e^{P^i r^i}} \quad D = \frac{1}{1 + e^{P^i r^i}}$$

where, $P^i$ is priority index set for different traffic types like Voice over IP (VoIP), data, voice, etc. and $r^i$ is the ideal rate for a certain type in LTE.

According to an embodiment of the disclosure, the priority decision module (108) of the aerial communication system (100) is configured to prioritize the one or more users based on the score of the utility function of each user. A critical user may get preference over non-critical one or more users.

According to an embodiment of the disclosure, the scheduling module (110) of the aerial communication system (100) is configured for optimizing the network performance and to allocate resource blocks to the one or more users. It would be appreciated that the criticality aware scheduling is not only optimizes the overall network performance but also improves quality of experience for the critical users who are trapped in the disaster and require immediate action. The criticality aware scheduling scheme allocates the resource blocks to the one or more users who have highest total utilities maximizing the quality of experience of critical users in addition to increasing overall network throughput. In addition to this, due to the priority sharing with criticality factors, the overall utility may attain at least a near-optimal solution with better quality of experience for critical users.

In an example, for an at least one communication equipment of the one or more users $UE_i$, if $K = \{1, 2, 3 \ldots k\}$ be the available resource block set, $x_{i,j}$ be the Boolean value to denote at least one communication equipment of the one or more users, and $U_{i,j}$, be the utility of the at least one communication equipment of the one or more users then the overall network optimization function can be defined as;

$$\text{Maximize} \sum_{i=1}^{n} \sum_{j=1}^{k} U_{ij} \times x_{ij}$$

wherein the above mentioned equation is subjected to constraints such as:
a. $r_{i,j} \leq B_{i,j}$, where $B_{i,j}$ is the capacity of each communication equipment over resource blocks, it ensures that the transmitted data should not exceed the capacity of the resource blocks.
b. $\epsilon_{i,j} \geq \epsilon_{min}$, where, $\epsilon_{min}$ is minimum energy required for each communication equipment and further it ensures that there is at least minimum energy level left with $i^{th}$ user to be scheduled for transmission;
c. $Z_i \leq Z_{max}$, where, $Z_{max}$, is the maximum altitude and it puts a bound on the maximum altitudes of users; and
d. $x_{i,j} = 0/1$, for each i, j which explains that each resource block can be assigned to at-most one at least one communication equipment of the one or more users.

According to an embodiment of the disclosure, the quality collection module (112) of the aerial communication system (100) is configured to collect a channel quality indicator information from the each communication equipment of one or more users. During each transmission time the eNB collects the channel qualities of equipment of the one or more users using channel quality indicator values. The channel quality indicator index is further used to estimate the modulation and coding scheme (MCS). Hence, more is the CQI index, higher will be the data transmission rate and lesser number of resource blocks required.

According to an embodiment of the disclosure, the central base station (114) mounted on the unmanned aerial vehicle (UAV) (116) is being used to provide communication services to the one or more distressed users to send and receive messages, videos, images, etc. The central base station is configured for scheduling link to establish communication with at least one communication equipment of the one or more users based on the collected a channel quality indicator information and output of the priority decision module. It would be appreciated that the communication infrastructure such as a long term evolution (LTE) based Evolved Node B (eNB) is being used as a central base station for the purpose of description of this disclosure but it should not be construed as limiting the scope of the disclosure herein.

In another aspect the embodiment here provides a method (200) illustrating the steps involved for providing communication services to one or more users distributed over a geographical area as shown in FIG. 3. Initially, at the step (202), where the process analyzes a utility function of each user to score critical state of each user using a utility analysis module. The utility function of each user comprising at least one criticality of one or more criticalities to each user trapped in the disaster. The one or more criticalities to each user includes a low remaining energy of each at least one communication equipment of the one or more users, a physical surroundings of the user and a data rate component to ensure throughput for the communication services with one or more users. The utility function of each user represents low remaining energy of the at least one communication equipment of the one or more users, physical surroundings of each user and data rate component to ensure throughput for the communication services with the one or more users.

At the step (204), where the process prioritizes the one or more users trapped in disaster based on the score of utility function of each user using a priority decision module. A critical user may get preference over non-critical one or more users. In a disaster scenario such as flood in an urban environment, one or more users get trapped in their homes, offices, etc., and may not be able to communicate their messages. Due to devastated infrastructure, users may not get enough options to recharge their communication devices. The one or more users are distributed in different houses and buildings over a geographical area. In addition to, it is assumed that the users are semi-static without much movements in a short frame of time.

At the step (206), where the process optimizes the network performance for allocating resource blocks to the one or more users based on the priority using a critical aware scheduling module. It would be appreciated that the criticality aware scheduling is not only optimizes the overall network performance but also improves quality of experience for the critical users, who are trapped in the disaster and require immediate action. The criticality aware scheduling scheme allocates the resource blocks to the users who have highest total utilities maximizing the quality of experience of critical users in addition to increasing overall network throughput. In addition to this, due to the priority sharing with criticality factors, the overall utility may attain at least a near-optimal solution with better quality of experience for critical users.

At the step (208), where the process collects a channel quality indicator information from each equipment of one or more users using a quality collection module. It would be appreciated that the criticality aware scheduling is not only optimizes the overall network performance but also improves quality of experience for the critical users who are trapped in the disaster and require immediate action. The criticality aware scheduling scheme allocates the resource blocks to the users who have highest total utilities maximizing the quality of experience of critical users in addition to increasing overall network throughput. In addition to this, due to the priority sharing with criticality factors, the overall utility may attain at least a near-optimal solution with better quality of experience for critical users.

During each transmission time the eNB collects the channel qualities of communication equipment of one or more users using channel quality indicator values. The channel quality indicator index is further used to estimate the modulation and coding scheme (MCS). Hence, more is the CQI index, higher will be the data transmission rate and lesser number of resource blocks required.

At the step (210), where the process provides an unmanned aerial vehicle (UAV) mounted with a central base station, wherein the central base station is configured for uplink scheduling to communicate with at least one communication equipment of the one or more users based on the collected channel quality indicator information and output of the priority decision module. It would be appreciated that the communication infrastructure such as a long term evolution (LTE) based Evolved Node B (eNB) is being used for the purpose of description of this disclosure but it should not be construed as limiting the scope of the disclosure herein.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein provides a method and system for providing aerial communication services to one or more users distributed over a geographical area. It analyzes utility function of criticalities to assure an efficient resource allocation mechanism where critical users get preference over non-critical users. The users to be in a critical state either due to low remaining energy of at least one communication equipment of the one or more users or because of the criticality due to their physical surroundings and data rate component to ensure throughput for the communication services may get priority over the other comparatively less critical users. Herein, an assisted global positioning system (A-GPS) is being used for obtaining information of physical criticality of the users distributed over a geographical area.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

What is claimed is:

1. An aerial communication system (100) for providing communication services to one or more users distributed over a geographical area, the aerial communication system (100) comprising:
    a memory (102) with a set of instructions;
    a processor (104), wherein the processor (104) communicatively coupled with the memory (102);
    a utility analysis module (106) configured to analyze a utility function of one or more criticalities of the one or more users to score critical state of each user, wherein the one or more criticalities of the user includes a low remaining energy of at least one communication equipment of the user, a physical surrounding of the each user and a data rate component to ensure throughput for the communication services with the at least one communication equipment;
    a priority decision module (108) configured to prioritize the one or more users based on the score of utility function of the one or more users;
    a scheduling module (110) configured to optimize a network performance based on the result of the utility analysis module and to allocate resource blocks to at least one communication equipment of the one or more users based on output of the priority decision module (108);
    a quality collection module (112) configured to collect a channel quality indicator information from each communication equipment of the one or more users; and
    an unmanned aerial vehicle (UAV) (116) mounted with a central base station (114), wherein the central base station (114) is configured for scheduling communication services to establish communication with at least one communication equipment of the one or more users based on the collected a channel quality indicator information and output of the priority decision module (108).

2. The aerial communication system (100) of claim 1, wherein the aerial communication system (100) to be used to establish communication with one or more users trapped over the geographical area in critical conditions and at least one user needs immediate attention.

3. The aerial communication system (100) of claim 1, further comprising an assisted global positioning system (A-GPS) to obtain information of physical criticality of the one or more users distributed over the geographical area.

4. The aerial communication system (100) of claim 1, wherein the one or more users trapped in the geographical area are in semi-static position without much movements in a short frame of time.

5. The aerial communication system (100) of claim 1, wherein at least one critical user get preference over non-critical users, wherein the criticality is determined based on score of utility function of each user.

6. A computer implemented method (200) for providing aerial communication services to one or more users distributed over a geographical area, the method comprising:
- analyzing a utility function of each user to score critical state of each user using an utility analysis module (106), wherein the utility function of each user comprising at least one criticality of one or more criticalities to each user, wherein the one or more criticalities to at least one user include a low remaining energy of at least one communication equipment of the user, a physical surroundings of the user and a data rate component to ensure throughput for the communication services with the at least one communication equipment of the user;
- prioritizing one or more users based on the score of utility function of each user using a priority decision module (108);
- optimizing a network performance using a scheduling module (110) for allocating resource blocks to at least one user of one or more users based on priority;
- collecting a channel quality indicator information from at least one communication equipment of the one or more users using a quality collection module (112); and
- providing an unmanned aerial vehicle (UAV) (116) mounted with a central base station (114) for providing communication services to one or more users distributed over a geographical area, wherein the central base station (114) is configured for scheduling services to communicate with at least one communication equipment based on the collected channel quality indicator information and output of the priority decision module (108).

7. The method (200) of claim 6, wherein an assisted global positioning system (A-GPS) is used for obtaining information of physical criticality of the one or more users distributed over a geographical area.

8. The method (200) of claim 6, wherein the one or more users trapped over the geographical area are in semi-static without much movements in a short frame of time.

9. The method (200) of claim 6, wherein at least one critical user get preference over non-critical users, wherein the criticality is determined based on score of utility function of each user.

10. A non-transitory computer readable medium storing one or more instructions for providing aerial communication services to one or more users distributed over a geographical area, wherein the one or more instructions comprising:
- analyzing a utility function of each user to score critical state of each user using an utility analysis module (106), wherein the utility function of each user comprising at least one criticality of one or more criticalities to each user, wherein the one or more criticalities to at least one user include a low remaining energy of at least one communication equipment of the user, a physical surroundings of the user and a data rate component to ensure throughput for the communication services with the at least one communication equipment of the user;
- prioritizing one or more users based on the score of utility function of each user using a priority decision module (108);
- optimizing a network performance using a scheduling module (110) for allocating resource blocks to at least one user of one or more users based on priority;
- collecting a channel quality indicator information from at least one communication equipment of the one or more users using a quality collection module (112); and
- providing an unmanned aerial vehicle (UAV) (116) mounted with a central base station (114) for providing communication services to one or more users distributed over a geographical area, wherein the central base station (114) is configured for scheduling services to communicate with at least one communication equipment based on the collected channel quality indicator information and output of the priority decision module (108).

11. The non-transitory computer readable medium of claim 10, wherein an assisted global positioning system (A-GPS) is used for obtaining information of physical criticality of the one or more users distributed over a geographical area.

12. The non-transitory computer readable medium of claim 10, wherein the one or more users trapped over the geographical area are in semi-static without much movements in a short frame of time.

13. The non-transitory computer readable medium of claim 10, wherein at least one critical user get preference over non-critical users, wherein the criticality is determined based on score of utility function of each user.

* * * * *